Feb. 28, 1956
H. H. HANLEY
COMBUSTION CHAMBER AND METHOD
OF MIXING AND BURNING FUEL
2,736,168
Filed Nov. 25, 1950
2 Sheets-Sheet 1
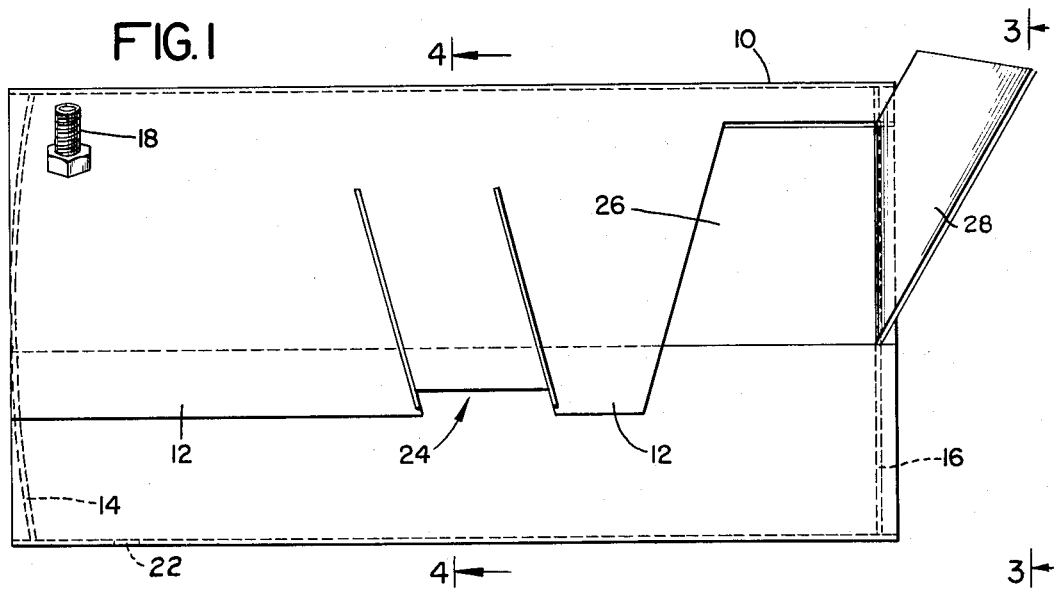
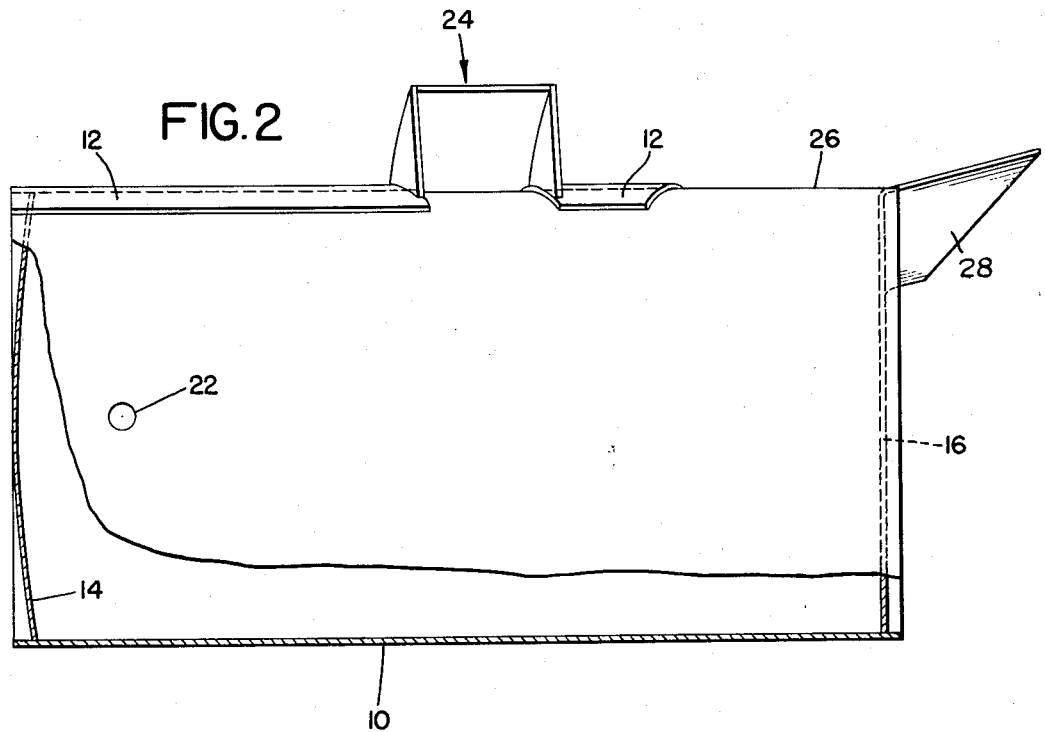
INVENTOR.
HARVEY H. HANLEY
BY Robert S. Dunham
ATTORNEY.

Feb. 28, 1956

H. H. HANLEY 2,736,168

COMBUSTION CHAMBER AND METHOD
OF MIXING AND BURNING FUEL

Filed Nov. 25, 1950

INVENTOR.
HARVEY H. HANLEY
BY Robert S. Dunham
ATTORNEY.

United States Patent Office 2,736,168
Patented Feb. 28, 1956

2,736,168

COMBUSTION CHAMBER AND METHOD OF MIXING AND BURNING FUEL

Harvey H. Hanley, Hawthorne, N. J.

Application November 25, 1950, Serial No. 197,547

9 Claims. (Cl. 60—39.69)

This invention relates to a combustion chamber, and more particularly pertains to such a chamber for use in connection with a gas turbine, such as in the power plant of a jet-propelled aircraft. The combustion chamber of the invention also has great utility in connection with ram-jet engines, rockets and guided missiles generally.

The combustion chamber of the invention possesses many advantages not found in combustion chambers in common use.

One of the most important of such advantages is great fuel economy. In fact, the use of the combustion chamber of the invention will result in consuming up to as much as 70% less fuel than is needed where a conventional combustion chamber is employed. This saving is due basically to two factors. First, assuming proper conditions, such as a correct mixture of fuel and air, complete combustion will occur within the combustion chamber itself, and substantially no unburned fuel will be wasted through the turbine exhaust. Second, the combustion chamber of the invention requires considerably less air to operate it than does a combustion chamber of the conventional type. It is a matter of common knowledge in the art that as much as 75% of the power developed by the turbine may be absorbed internally in driving the air compressor. That is, a 2,000 H. P. unit may finally deliver but 500 thrust horse power. Because no excess air is needed to cool the turbine blades, the combustion chamber of the invention requires considerably less air than is needed where a conventional chamber is employed.

Other gaseous oxidizing agents than air can be used, if desired, and what is said herein of air is equally applicable to them.

Another major advantage afforded by the invention is that no metallurgical problem is presented in constructing either the chamber itself or the related turbine. As to the former, this is because complete combustion takes place entirely in the central portion of the chamber and can be limited to a very small space therein; hence the metal of the chamber is not highly heated. As to the latter, this is because the products of such complete combustion emerge from the chamber and impinge upon the turbine blades at a lower temperature relative to that encountered where a conventional combustion chamber is used. The attainment of this advantage results from the aforementioned complete combustion within the combustion chamber.

Another advantage resulting from the use of a chamber constructed in accordance with the principles of the invention is that heat losses through the walls of the chamber, both by convection and by radiation, are reduced to a minimum. This is partially because, as aforesaid, the flame is confined to the central portion of the chamber, due to the presence of a "tornado" effect (to be described).

Further, it will be seen that the combustion chamber of the invention can be used to advantage in stationary plants, since less equipment is needed.

The combustion chamber is of very simple, inexpensive construction. Any of many types of combustible material can be used as fuel, together with any of many types of fuel injection.

Broadly, the combustion chamber of the invention comprises a cylindrical shell having fuel input means near one end thereof and outlet for the products of combustion near the other end, and an air input opening located between the ends of the chamber and biased toward the fuel input means. The purpose of biasing the incoming air as aforesaid is to produce within the chamber a rapidly rotating mass of air surrounding a core in which the flame is confined. This is the "tornado" effect referred to above, and any combustion chamber which in operation produces such a flame confining core is within the contemplation of the invention.

In conventional combustion chambers, it is well known to admit air tangentially of the chamber, but so far as I am aware, until now, no one has ever biased the incoming air toward the fuel input means to produce the "tornado" effect.

Accordingly, it is an important object of the invention to provide a combustion chamber for use in connection with gas turbines, ram-jet engines, rockets, guided missiles, and the like, which in operation will produce a "tornado" effect with its accompanying core in which the flame can be readily confined.

It is another important object of the invention to provide such a combustion chamber in which the amount of fuel needed is greatly reduced, because of the substantially complete consumption of the fuel.

It is another object to provide such a chamber in which combustion will be complete.

It is a further object to reduce substantially the amount of necessary air.

It is still another object to provide such a chamber in the construction of which metallurgical problems are reduced to a minimum or eliminated altogether.

It is still a further object to reduce greatly the temperature of the exhaust gases of the chamber.

It is yet another object to provide such a chamber which can be used with turbine blades having a much lower melting point than has been heretofore possible.

It is yet a further object to provide such a chamber in which heat losses through the walls of the chamber are reduced to a minimum.

It is another object to provide such a chamber which is of simple, inexpensive construction.

The above and other objects and advantages will appear more clearly from the following description, taken in conjunction with the accompanying drawings, in which:

Fig. 1 is a top view of a combustion chamber constructed in accordance with the invention;

Fig. 2 is a side view partly in section, of the combustion chamber illustrated in Fig. 1;

Like reference characters denote like parts in the various views.

The combustion chamber is comprised of a cylindrical shell 10 of suitable material, such as rolled steel, the edges of which may slightly overlap, as at 12.

A disk, which may be slightly convex outwardly, for reasons which will appear, closes one end 14 of the chamber, and another disk partially closes the other end 16 of the chamber.

Figure 3:
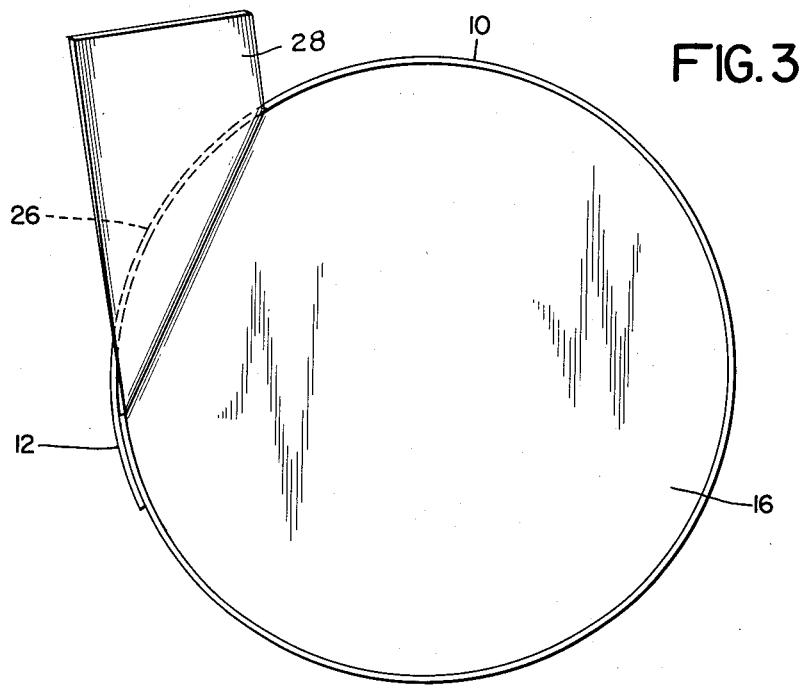
Fig. 3 is an end view of the chamber of Fig. 1 as seen from line 3—3.
Figure 4:
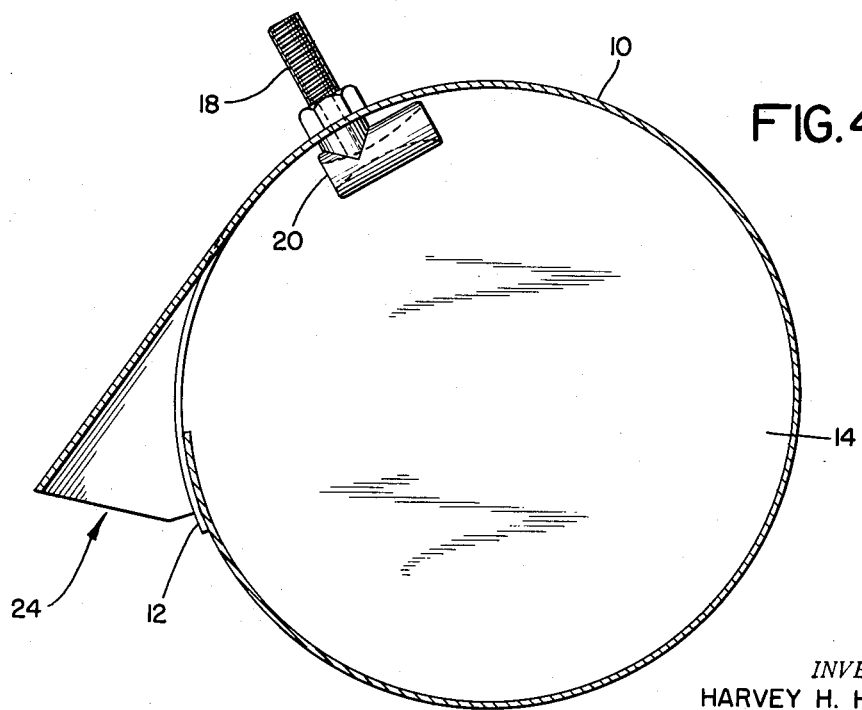
Fig. 4 is a sectional view taken along line 4—4 of Fig. 1.

Fuel input means are provided through the threaded connection 18 near the convex end 14 of the chamber (Figs. 1 and 3). In the illustrated embodiment of the invention, the fuel injection means 20 is of the venturi type, but any conventional type fuel injection will suffice. The fuel may be fed by gravity alone to the fuel input means 20, but to obtain best results, i. e. even delivery of the fuel, the fuel can be advantageously fed under a small additional pressure. No atomization of the fuel is needed.

An opening 22 (Fig. 1) is provided in the shell 10 for the insertion of a spark plug (not shown) near the fuel injection means 20.

Means for admitting air into the chamber is provided in the shell 10 at 24. The air inlet means 24 is adapted to admit air under pressure tangentially of the shell 10 and in a direction biased back toward the fuel injection means 20, as best seen in Fig. 1.

Another opening 26 near the end 16 of the shell 10 is provided to permit the products of combustion to escape from the combustion chamber, to impinge upon the blades of a turbine (not shown), for example. If desired, the products of combustion could be taken directly out of the end 16 of the chamber. It will be noted that the opening 26 includes a portion of the end 16 of the chamber, see Fig. 3. This portion of the opening 26 is bordered by a flange 28. Of course, the opening could be entirely in the end 16.

In operation, after the combustion chamber has been initially fired by the spark plug, compressed air is forced into the chamber through the air inlet means 24, i. e., tangentially of the shell 10 and biased toward the fuel injection means 20. It will be appreciated that this produces a rotating mass of relatively cool air which tends, due to centrifugal force, to concentrate against the inner surface of the shell 10. This relatively cool air effectively cools the shell 10 and prevents undue loss of heat through the shell by convection and/or radiation. A core of rarified air is produced within the rotating mass of air, axially of the chamber. This is the "tornado" effect, which confines the flame to the desired location.

The fuel burns in the central portion of the chamber, away from the shell 10, within the core of the rotating mass of air. If the end 14 of the shell 10 is flat, a portion in the central part thereof may become incandescent. It is therefore recommended that the end 14 be as shown, slightly convex outward. It will be noted that the incoming air sets up a vortex of air that travels axially toward the closed end 14 of the shell 10. Then after fuel is mixed the fuel-air mixture must reverse its axial direction of flow to travel out toward the exhaust. This means that in effect, there is set up an inner vortex of fuel-air mixture still rotating in the same direction but the flow of which is now axially reversed to travel out the exhaust, while being confined within the whirling mass of incoming air which has been described above.

By regulating the mixture of fuel and air, the flame can be confined to practically any sized volume, in which complete combustion takes place. By increasing the amount of incoming air, the flame will be confined to a smaller volume. If the flame spills out of the chamber, it simply means that more air is needed to complete the combustion.

In fact, complete combustion may be had in a controlled volume within the combustion chamber for practically any speed, however high, of incoming air. This is what makes the invention applicable to ram-jet engines, rockets and guided missiles, where the speed of incoming air may approach 10,000 feet per second.

The products of combustion then escape through the opening 26 at a relatively low temperature, since the combustion has been complete. The heat developed by the combustion is translated, in large part, into speed of air flow. If the air input opening 24 and the exhaust opening 26 have an area ratio of one to one, the exhaust gases will have a speed or pressure a little over three times that of the incoming air.

Many modifications, substitutions and equivalents will be apparent to those skilled in the art, and I do not limit myself to the details hereinabove set forth except as defined by the following claims.

Having thus described my invention, I claim:

1. A combustion chamber for use in connection with a gas turbine, including a cylindrical shell having a closed end, input means for admitting fuel into said chamber near said closed end, and air input means for introducing and directing high velocity air into said chamber tangentially near the circumference thereof and biased toward said fuel input means, said air input means being located axially away from said fuel input means and said closed end to form a rotating mass of relatively cool air surrounding the fuel-air mixture after ignition.

2. A combustion chamber for use in connection with a gas turbine and the like, including a cylindrical shell having a closed end, input means near said closed end for admitting fuel into said chamber, and means for introducing high velocity air into said chamber tangentially of the circumference thereof comprising air inlet means for introducing substantially the entire supply of air for said chamber, said air inlet means being located a substantial distance axially from said fuel input means and being biased toward said closed end in order to form a rotating mass of relatively cool air surrounding the mixture of fuel and air which is confined to the core and moves axially away from the closed end while combustion takes place.

3. A combustion chamber for use in connection with a gas turbine and the like, including a cylindrical shell having a closed end and an exhaust end, input means near said closed end for admitting fuel into said chamber, and means for introducing and directing high velocity air into said chamber tangentially of the circumference thereof comprising air inlet means for introducing substantially the entire supply of air for said chamber, said inlet means being located nearer said exhaust end than said closed end and being biased toward said closed end in order to form a rotating mass of relatively cool air surrounding the mixture of fuel and air which is confined to the core and moves axially away from the closed end while combustion takes place.

4. A combustion chamber for use in connection with a gas turbine and the like, including a cylindrical shell having a first end closed by a disk which is slightly convex outwardly, a second end, input means for admitting fuel into said chamber near said closed end, means near said fuel input means for initially igniting said fuel, means located centrally of the length of said chamber for introducing the entire supply of high velocity air into said chamber tangentially of the circumference thereof and biased toward said fuel input means, to produce a rotating mass of air having a core at the center thereof, and means for ejecting the products of combustion from said chamber near said second end thereof.

5. The invention set forth in claim 4, wherein said chamber further includes means substantially closing said second end, and means between said air introducing means and said second end for ejecting the products of combustion from said chamber.

6. The invention set forth in claim 4, wherein means are provided for ejecting the products of combustion from said chamber through an opening in said second end.

7. A combustion chamber for use in connection with a gas turbine, a ram-jet engine, a rocket, a guided missile and the like, including a cylindrical shell having a closed end, input means near said closed end for admitting fuel into said chamber, and means for introducing a high velocity oxidizing agent into said chamber tangentially of the circumference thereof and biased toward said fuel input means to produce within said chamber a rotating gaseous mass of oxidizing agent having a core at the center thereof, so that the mixture of fuel and oxidizing agent will be confined to said core during combustion and while moving away from said closed end toward exhaust.

8. The invention set forth in claim 4, wherein said chamber further includes an opening in said shell for ejecting the products of combustion from said chamber.

9. In the combustion of a fuel utilizing the expansion pressure of a mixture of fuel and air or other oxidizing agent, the method of mixing and burning said fuel and air within a combustion chamber having a closed end and an exhaust end, comprising the steps of: admitting substantially all of said air into said combustion chamber in a manner such as to form a unidirectional, rotating vortex of input air moving axially toward said closed end and away from said exhaust end; injecting fuel into said chamber; igniting the fuel air mixture, whereby said closed end in conjunction with said vortex of input air will act to create a reverse axial flow of the mixture in an inner, flame confining core of said vortex towards said exhaust and so as to cause substantially complete combustion within said core without causing undue heating to said combustion chamber.

References Cited in the file of this patent

UNITED STATES PATENTS

| | | |
|---|---|---|
| 2,097,255 | Saha | Oct. 26, 1937 |
| 2,395,103 | Clausen et al. | Feb. 19, 1946 |
| 2,438,858 | Lindsey et al. | Mar. 30, 1948 |
| 2,458,992 | Hague | Jan. 11, 1949 |
| 2,483,780 | Parmele | Oct. 4, 1949 |
| 2,488,911 | Hepburn et al. | Nov. 22, 1949 |
| 2,539,165 | Saha | Jan. 23, 1951 |
| 2,576,046 | Scarth | Nov. 20, 1951 |
| 2,579,614 | Ray | Dec. 25, 1951 |
| 2,591,422 | Goddard | Apr. 1, 1952 |
| 2,601,000 | Nerad | June 17, 1952 |

FOREIGN PATENTS

| | | |
|---|---|---|
| 401,868 | Great Britain | Nov. 23, 1933 |
| 376,570 | Germany | May 30, 1923 |